United States Patent

La Coste et al.

[15] 3,642,024
[45] Feb. 15, 1972

[54] BUTTERFLY VALVE

[72] Inventors: Bernard L. La Coste, Wilmington, Del.; Suryakant K. Dawawala, Glenolden, Pa.

[73] Assignee: Westinghouse Electric Corporation, Pittsburgh, Pa.

[22] Filed: Mar. 9, 1970

[21] Appl. No.: 17,531

[52] U.S. Cl. ..........................................137/340
[51] Int. Cl. ..........................................F16k 49/00
[58] Field of Search ..........137/340, 338; 251/305, 308; 308/72, 77

[56] References Cited

UNITED STATES PATENTS

| | | | |
|---|---|---|---|
| 2,053,668 | 9/1936 | Kinzie et al. | 251/305 X |
| 2,351,613 | 6/1944 | Hopkins | 137/338 X |
| 3,074,421 | 1/1963 | Borcherdt | 251/305 X |
| 3,240,541 | 3/1966 | Levesque | 308/77 |
| 3,272,223 | 9/1966 | Sass | 137/340 |
| 3,332,660 | 7/1967 | Slawinski et al. | 137/340 X |
| 3,351,999 | 11/1967 | McCloskey | 308/72 X |
| 3,387,899 | 6/1968 | Hahn et al. | 308/77 |
| 3,428,374 | 2/1969 | Orkin et al. | 308/72 X |

Primary Examiner—Samuel Scott
Attorney—A. T. Stratton, F. P. Lyle and F. Cristiano, Jr.

[57] ABSTRACT

This invention relates to a control valve of the butterfly-type which is capable of quickly and dependably stopping the flow of steam under high temperature and pressure in a large diameter conduit, such as may be used in conjunction with a steam turbine. After stoppage of the steam flow, the valve is capable of reopening against the full steam pressure drop built up across the valve.

The valve comprises a valve body, a butterfly disc, and a shaft, the shaft supporting the disc within the valve body. The shaft is supported on spherical bearings located outside of the valve body. Various cooling means are used to prevent the bearings from overheating.

A self-adjusting sealing structure surrounds the shaft to prevent leakage of steam to the surrounding environment. A single-acting hydraulic actuator is provided through various linkages to open and control the butterfly disc against the full pressure drop across the disc. The disc is eccentrically connected to the shaft so that relatively small helical springs can close the disc within approximately 0.15 seconds upon loss of hydraulic actuating pressure. The valve is designed to absorb the large impact forces.

23 Claims, 6 Drawing Figures

PATENTED FEB 15 1972

INVENTORS
Bernard L. LaCoste
Suryakant K. Dawawala

WITNESSES

BUTTERFLY VALVE

BACKGROUND OF THE INVENTION

In the operation of large turbines, emergency conditions sometimes arise necessitating very sudden stoppage of the flow of steam. For example, during sudden losses of load on a generator, shutoff valves of very large size must be relied upon to stop steam flow in a fraction of a second to prevent overspeed of the turbine. Large steam turbine rotors are designed to operate within a 20 percent overspeed factor which on a complete load loss is exceeded in 0.20 to 0.25 seconds. If the overspeed is not checked, the rotor and blades will fly apart due to the excessive centrifugal force.

After overspeed has been checked, the steam "bottled-up" ahead of the closed valves must be relieved through the turbine, while reestablishing normal running speed. Therefore, these valves must also be capable of reopening and controlling the steam flow against a full steam pressure drop across the valves.

In the past, no valve and in particular no butterfly valve has been found which is entirely suitable for meeting the very rigid requirements of such emergency conditions, namely, the simultaneous occurrence of high steam temperature and pressures, large steam flows, large butterfly disc diameters, the requirement of an exceedingly small valve closing time with a "fail-safe" closing feature and reopening controlling capabilities. More specifically, there is typically a pressure difference of about 300 p.s.i. at 575° F. with steam flows of about 2 to 3 million lbs./hour, flowing in a large conduit having a valve with a butterfly disc diameter of about 30 to 36 inches, or larger, which must be closed in about 0.15 seconds.

In steam turbine applications, there are commonly four inlet steam conduits connected in fluid communication with a reheat stop valve and an interceptor valve, one acting as a backup for the other. Both of these valves may close due to the same signals, e.g., complete bearing oil loss, or one may close and then have to reopen again for a signal due to a transient trip rejection.

Due to the proximity of these valves, the space available for power amplifying external linkages, springs, actuators, supporting structure etc., is very limited and consequently, the valve must be mounted to the steam inlet conduit with no direct external supporting structure.

Furthermore, after closing, following an electrical load rejection trip, the valve must be capable of both reopening and controlling the steam flow against a steam pressure drop across the disc. This pressure drop across the disc, having a diameter of the order of about 36 inches, results in very large bearing reactions. Metal-to-metal bearings are not adequate, since the resulting friction between the shaft and bearing is so high that it is not possible to obtain either springs or actuators large enough to overcome these frictional forces to close the disc. Furthermore, the actuator sizes to overcome the friction and open the valve are too large and hence impracticable for this situation. Roller bearings would reduce friction levels to allow normal sizes of springs and actuators, but the operating temperature of about 575° F. prevents their use if they are located in a conventional manner adjacent the disc as commonly used in butterfly valves. Another limitation of conventional roller bearings which makes them impractical for the present invention is the abnormal wear when the rollers remain in the open position for long periods of time subjected to vibratory motion, although small, results in the seating of the bearing elements at the point of bearing contact. Polytetrafluoroethylene (available under the trademark Teflon) bearings would reduce the friction to suitable levels where double-acting actuators are available for opening and closing, however, abnormally large accumulators would be required to insure safe and fast closing operation if hydraulic fluid pressure is lost. Additionally, the accumulators are impractical because of the limited space requirement under conventional practices. Furthermore, Teflon bearings cannot normally be used adjacent to the butterfly disc because they cannot withstand the high operating temperature, and therefore would have to be located outside of the main valve body resulting in abnormal shaft deflections.

In some applications, such as nuclear applications wherein the possibility of radioactivity in the turbine steam exists, it is necessary to maintain zero steam leakage past the shaft ends of the valve into the turbine room at all times. Therefore the shaft seals must be self-adjusting to compensate for wear and large shaft deflections. Moreover, shaft seal friction must be kept very small so as not to aggravate an already high friction level between the bearings, and the shaft. These requirements are not met by normal sealing devices in current use when applied to periodic oscillating motion and abnormal shaft deflection of approximately one-eighth inch and at temperatures above 500° F.

Another requirement, which is difficult or impossible to be met by known valves of this size and operating under such high temperatures and high pressures, is that they must close in dashpot"about 0.15 seconds to effectively shut off steam flow to the turbine to prevent overspeed and possible destruction of the rotor. The closing force must be large enough to discharge the volume of oil from the actuator cavity and accelerate the large moment of inertia of the large diameter disc to angular velocities high enough to close the disc in a very short period of time. However, in order to prevent damage to the valve resulting from the high kinetic energy level at the very end of the closing stroke during seating of valve parts, a "dashpos" type of action must be provided to dissipate the kinetic energy to a level which can be absorbed at impact without damaging valve component parts.

A further requirement is that the valve must be "fail-safe" in its closing action over the entire stroke. The conventional practice of resorting to gearing, counterweights, or some form of high leverage ratio for closing of large valves is unsatisfactory because of the very fast closing time requirements and space limitations of the present invention; therefore, either springs or a double-action hydraulic actuator with a large accumulator are required.

Since the valves are normally open and must operate in this position for long periods of time under relatively high-speed flows, without disc "flutter" or vibration, both proper aerodynamic shaping of the disc and a physical internal disc stopping pin is required to prevent excessive vibration. In using a stopping pin within the valve, the restraint must not restrict the full open steam flow.

No valves in the art are known which would be suitable for meeting all of the above-stated requirements.

BRIEF SUMMARY OF THE INVENTION

This invention relates to a valve connected to a large conduit that will operate under the conditions of high temperature, high pressure and a large fluid flow so as to completely stop such flow in a small fraction of a second and is further capable of reopening and controlling the rate of flow of the fluid. As a typical application, the valve can be used as a reheat stop valve and/or an interceptor valve for a large steam turbine. The valve is of the butterfly type and is comprised of a cylindrical valve body, a butterfly disc, and a shaft rotatably supporting the disc within the valve body.

The shaft extends radially outward from both sides of the valve body and is supported by two spherical-type Teflon lined bearings, one on each side. The bearings are housed in bearing supports which have a plurality of annular fins for cooling purposes. Furthermore, on the shaft ends are axially extending and radially extending holes to further assist in cooling the bearings.

Between the valve body, the shaft, and each bearing is a mechanical bellows seal structure. The seal structure has a self-adjusting bellows portion which provides a pressure seal and the flexibility to accommodate large shaft deflections to prevent steam leakage under all load conditions. Additionally, a backup sealing arrangement is provided by a vacuum steam leak-off passage so that zero leakage occurs.

Encompassing the shaft between each seal structure and bearing is a radially segmented carbon ring structure used to accommodate large shaft deflections due to the outside location of the shaft bearings relative to the valve body. The ring structure also regulates the amount of cooling air flowing through the axial and radial holes.

The shaft is eccentrically secured to the disc relative to the axial centerline of the disc. This results in an unbalanced torque acting on the disc in the direction of closing, enabling the disc to close in a fraction of a second and allowing the use of smaller springs to close the disc.

To further assist in rapid closing of the butterfly disc, a stop pin is provided which inclines the disc in a slightly closed position. The stop pin also minimizes disc vibrations.

THE DRAWINGS

THE PREFERRED EMBODIMENT

Figure 1:
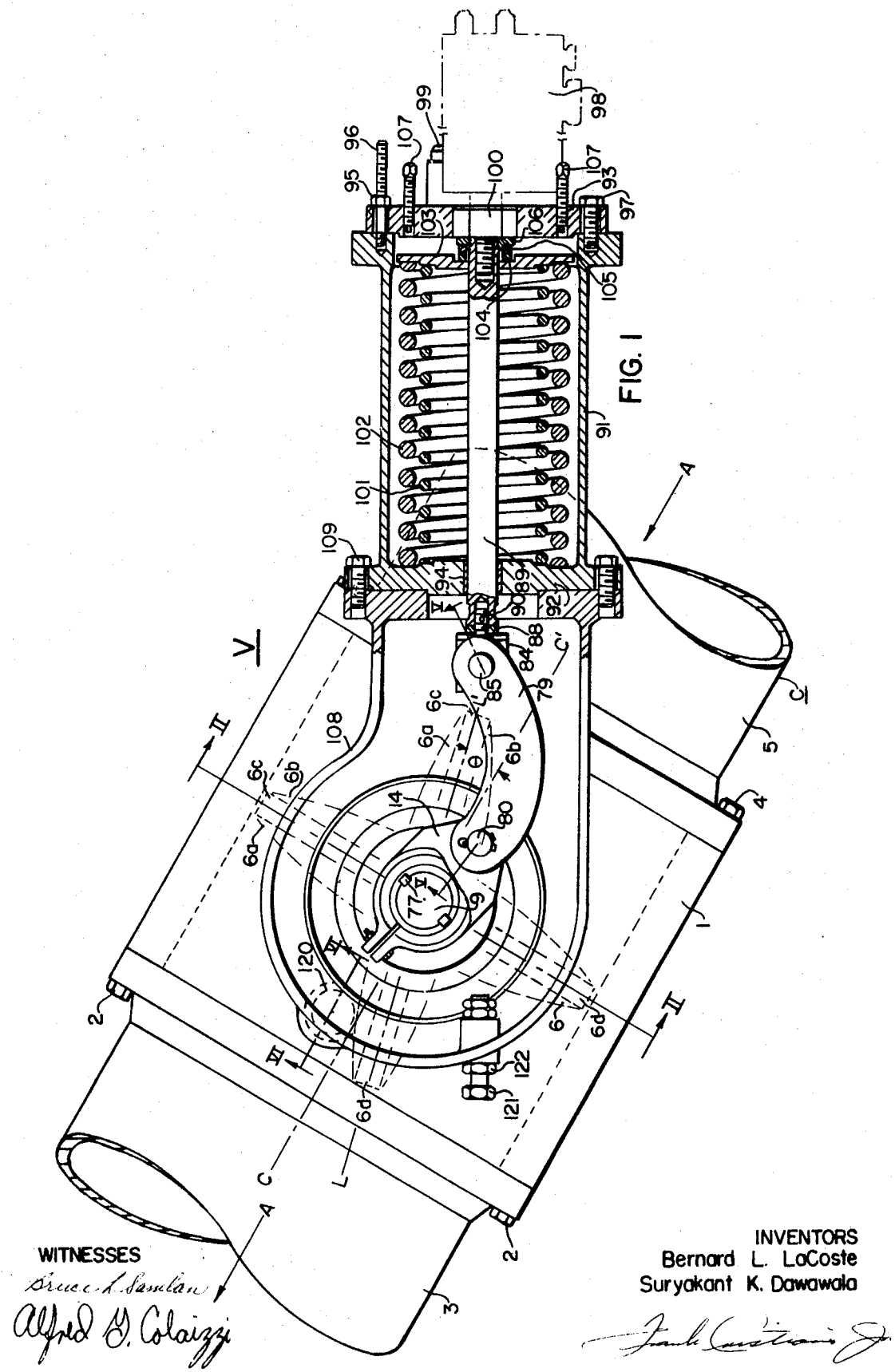
FIG. 1 is an elevational view, partly in cross section, of a valve of the butterfly type embodying the principles of the invention.

Referring to the drawings in detail, and in particular FIG. 1, there is shown a valve V of the butterfly type embodying the features of the present invention. Generally, in large steam turbines, there are four steam inlet conduits C (only one being shown) leading to low-pressure turbines (not shown). One interceptor valve and one stop valve are connected in series to each conduit C before the turbines. The valve V embodying the present invention may be used in the construction of both the stop valves and the interceptor valves which are used to protect the low-pressure turbines against overspeed on loss of load.

The valve V comprises a hollow cylindrical valve body 1 connected at its upstream end by bolts 2 to a portion 3 of the conduit C which may be an inlet conduit to a low pressure steam turbine (not shown). At the downstream end of the valve body 1, there is connected by bolts 4, a portion 5 of the conduit C, which may be connected to a moisture separator and steam reheater (not shown), the direction of steam flow being from right to left as indicated by the arrows A. The valve V has a butterfly disc portion 6 which is shown in two positions in dotted outline in FIG. 1. The disc 6 is in a closed position when it is in a plane normal to the valve body 1 and is in a fully open position when the disc is in a plane approximately parallel to the axis of the valve body. The disc 6 can also assume a partially open position to throttle or control the steam flowing through the valve V. The disc 6 is essentially in the shape of two spherical cap sections 6a and 6b joined together at their edges by a thin disc-shaped plate 6c.

Figure 2:
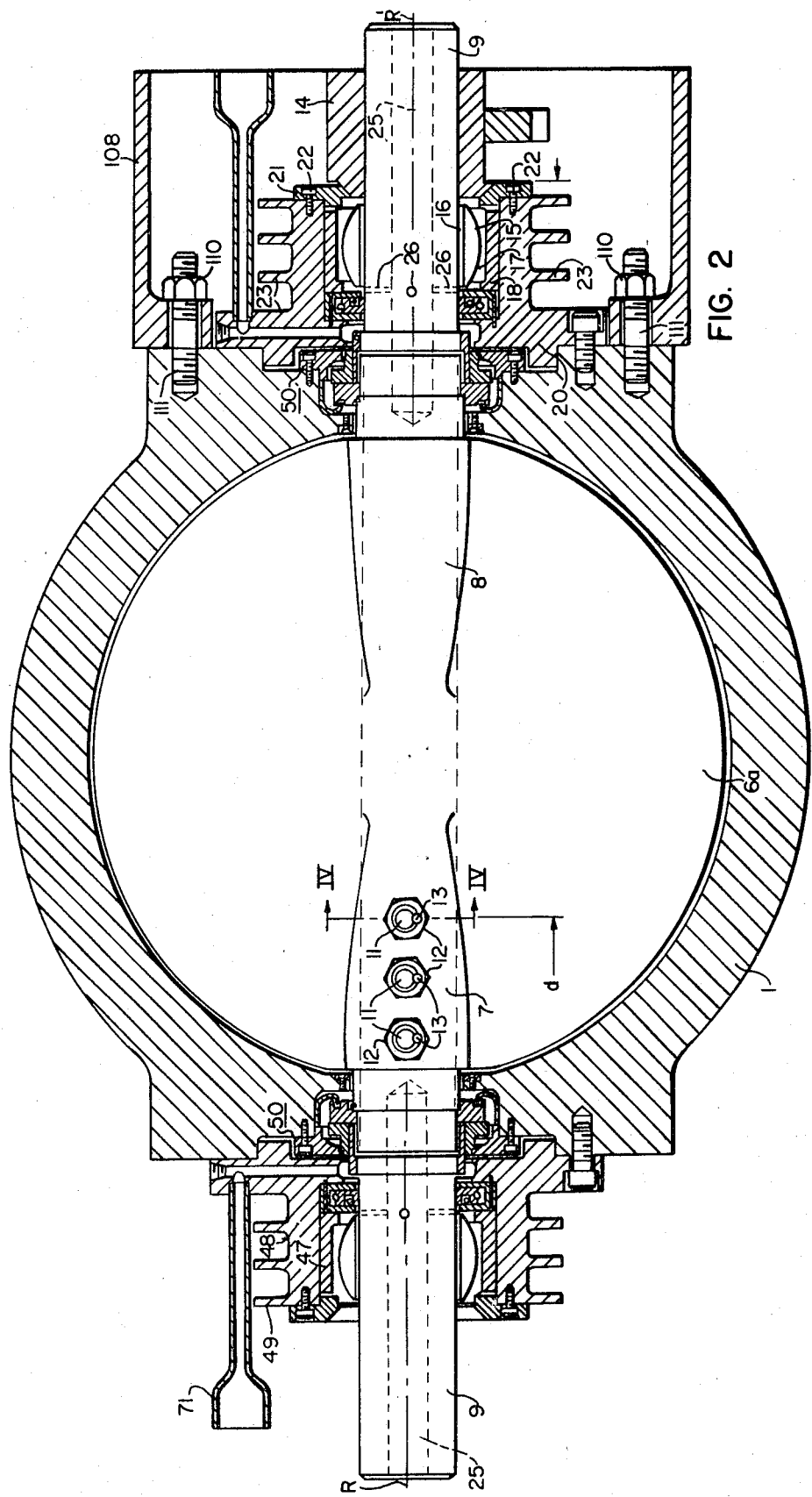
FIG. 2 is a cross-sectional view taken along line II—II of FIG. 1.
Figure 4:
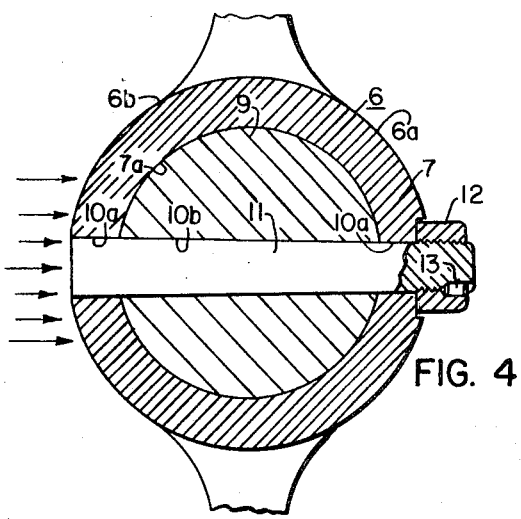
FIG. 4 is a cross-sectional view taken along line IV—IV of FIG. 2.

Referring to FIG. 2, the disc 6 has enlarged cylindrical hub portions 7 and 8 which are integral with the disc 6 and blend into the spherical contour 6a and 6b of the disc. The hub portions 7 and 8 are slightly off center or eccentric relative to the centerline of the shaft 9. A bore 7a is machined through the disc 6 and hub portions 7 and 8, which is best seen in FIGS. 2 and 4. A shaft 9 is inserted through the bore 7a to rotatably support the butterfly disc 6 within the valve body 1.

A plurality of tapered openings 10a are radially disposed relative to the shaft 9 (FIG. 4) on the hub portion 7 of the disc 6 and corresponding openings 10b are radially disposed on the shaft.

The shaft 9 is secured to the hub portion 7 of the disc 6 by tapered pins 11, which are screw threaded at one end, as seen in FIGS. 2 and 4. The butterfly disc 6 is in the closed position, as shown in FIGS. 2 and 4, and the pins 11 are in a plane normal to the axis of rotation R—R′ of the shaft 9. The larger diameter portion of the tapered pin 11 is flush with the disc side 6b. Disc side 6b is the side exposed to the force from the high pressure and temperature steam which in the closed position as indicated by the arrows in FIG. 4. The smaller diameter portion of the pin 11 is on the side of disc 6a away from the steam flow and is screw threaded to accept locking nut 12. Because of the high pressure and temperature steam on side 6b of the disc and the relatively lower pressure and temperature on the other side 6a of the disc pins 11 will tend to move from side 6b to 6 a and the pins tend to be drawn deeper into the tapered openings 10a and 10b. However, the tapering of the pins 11 and openings 10a and 10b prevent this movement as the pins become tightened in the openings. As disc 6 rotates around the axis of rotation R—R′ of the shaft 9, the disc tends to vibrate so nuts 12 may become loosened. Consequently, locking pins 13 are inserted in a direction parallel to pins 11 to insure a locking relation between the nuts 12 and pins 11.

Referring to FIG. 1, it can be seen that an operating lever 14 is secured to the shaft 9 which lever can also be found on the rightmost portion of the valve V in FIG. 2. The operating lever 14 is spaced at a distance d from the pins 11 (FIG. 2) so as to provide for the torsional flexibility of the shaft 9 to absorb a major portion of the high kinetic energy of the butterfly disc 6 when triggered from the open position to the closed position.

Referring to FIG. 2, the shaft 9 extends radially outward from the valve body 1. The shaft 9 is supported by spherical bearings 15, one bearing supporting each end of the shaft. Since the bearings are substantially the same only one will be described. There is a radial clearance between the bearings 15 and the shaft 9 to allow for thermal growth of the shaft. The inside surface 16 of the bearing 15 is preferably lined with Teflon to reduce friction between the bearing and the shaft 9 and to prevent the tendency for sticking. The spherical outer portion or inner portion of race 17 is also preferably lined with Teflon to reduce friction between the race and the spherical outer portion. As previously mentioned, the bearings 15 were commonly adjacent the disc 6. By positioning the bearings 15 away from the disc 6 in the direction of the axis of rotation R—R′ of the shaft 9, then this allows the use of Teflon bearing surfaces, since they are not as exposed to the heat of the steam environment. But the further away from the disc 6 the bearings 15 are situated, the greater the force reactions are at the bearings. When using a nonspherical bearing, as shaft 9 deflects there will be an abnormal force applied to the inner bearing surface 16 at the inside edge when disc 6 is subjected to steam loading. This stress, commonly called edge loading on the surface 16, is prevented by using spherical bearings which can rotate about their spherical races 17 to accommodate the severe deflections and thereby spreading out the forces along the entire bearing surface 16. This allows the use of a smaller diameter cylindrical Teflon sleeve bushing 16, pressed into the bore of the larger spherical bearing 15, thus reducing friction torque. Also, a smaller shaft, such as shaft 9, and smaller bearings, such as bearings 15 and 16, can be used since the additional rigidity needed in the shaft and bearings to accommodate the deflections is no longer necessary.

The bearing 15 is encompassed by an annular spacing member 18 to allow for expansion of the bearing which is in turn housed in an annular bearing support 20. A retaining ring 21 is fastened by screws 22 to the annular bearing support 20.

Because of the high temperature levels at the bearing 16, additional cooling means are provided at the bearings 15 and the shaft 9. The bearings 15 are cooled by a plurality of annular fins 23 extending radially outward relative to the shaft 9, the fins being integral with the annular bearing supports 20. The shaft 9 has a pair of holes 25, one on each end of the shaft, open to atmosphere and extending axially inward relative to the axis of rotation R—R′ of the shaft shown in dotted outline in FIG. 2. Additionally, the axially outer ends of shaft 9 extend beyond the bearings 15 to provide for an additional heat transfer surface for the cooling of the shaft 9 and the bearings 15. Just beyond the axially inner edge of the bearings 15, along the axis of rotation R-R', is a plurality of radially extending holes 26 (FIGS. 2 and 3) in fluid communication with the axial holes 25 and the bearings 15. The axial and radial holes 25 and 26 provide a passageway for cooling air from the atmosphere to the bearings, as indicated by the arrows E in FIG. 3. The structure regulating the amount of cooling air to the bearings 15 is described later.

A mechanical bellows seal structure 50 is provided, (FIGS. 2 and 3), which protects the bearings 15 from the steam and insures zero steam leakage with only a small frictional force.

An annular bearing ring 52 is secured to the inside of the valve body 1 surrounding the shaft 9 by screws 51. An annular mating ring 53, which is more axially outward relative to the axis of rotation R-R' of shaft 9, encompasses the shaft. The ring 53 is provided with an annular groove 53a on its axially inner face 53b, into which projects one end of an an aperture excluder the An annular packing ring 59 is provided between a shoulder of the shaft 9 and the radially inner diameter of the mating ring 53 to prevent steam leakage along the shaft. The mating ring 53 is held in its axial location by a tubular screw-threaded sleeve 68 which is threaded to shaft 9 to prevent the mating ring 53 from rotating relative to shaft 9. A plurality of setscrews 69 extend radially inward to secure the sleeve 68 to the shaft 9. A pin 60 extends radially outward from the shaft 9 and is inserted into an aperture in the mating ring 53 to insure no relative movement. The rotating portion of the seal structure 50 comprises the mating ring 53, the packing ring 59, the sleeve 68, the pin 60, and the setscrews 69.

Axially outward from the mating ring 53 is a stationary ring member 56. The ring member 56 has a groove in which is mounted an annular carbon ring seal 55 which is in frictional abutment with the mating ring 53. It is an unusual application to use a carbon seal because the shaft 9 only rarely rotates but it has been found experimentally that a seal could still be formed. Radially outward from the stationary ring member 56 and encompassing the member is the main seal body 70 which is also annular in shape. The main seal body 70 has an annular slot in which is an annular gasket 61. The gasket is maintained between the main seal body 70 and the valve body 1. The main body 70 is rigidly secured to the valve body 1 by a plurality of capscrews 62.

The stationary ring member 56 and the main seal body 70 jointly define an annular chamber 70a. A plurality of coil springs 57 and cylindrical bellows 58 maintain the stationary ring member 56 and the main seal body 70 in spaced relation and further maintain the carbon ring seal 55 in a sealing relation with the mating ring 53. The springs 57 and bellows 58 further allow for flexibility of the seal due to abnormal shaft deflections. To prevent any movement between the stationary ring member 56 and the main seal body 70 horizontally extending pins 56a are provided from the main seal body to the stationary ring member. The stationary portion of the seal structure 50 comprises the stationary ring member 56, the carbon ring seal 55, the main seal body 70, the gasket 61, screws 62, coil springs 57, the bellows structure 58, and the dirt excluder 54.

An annular collecting passage 71a is in fluid communication with the annular chamber 70a. In fluid communication with the collecting passage 71a is a radially extending steam leak-off passage 71 which is connected to a gland steam condenser (not shown). The condenser provides a vacuum to draw in any steam leakage around the shaft 9 and seal structure 50.

Figure 3:
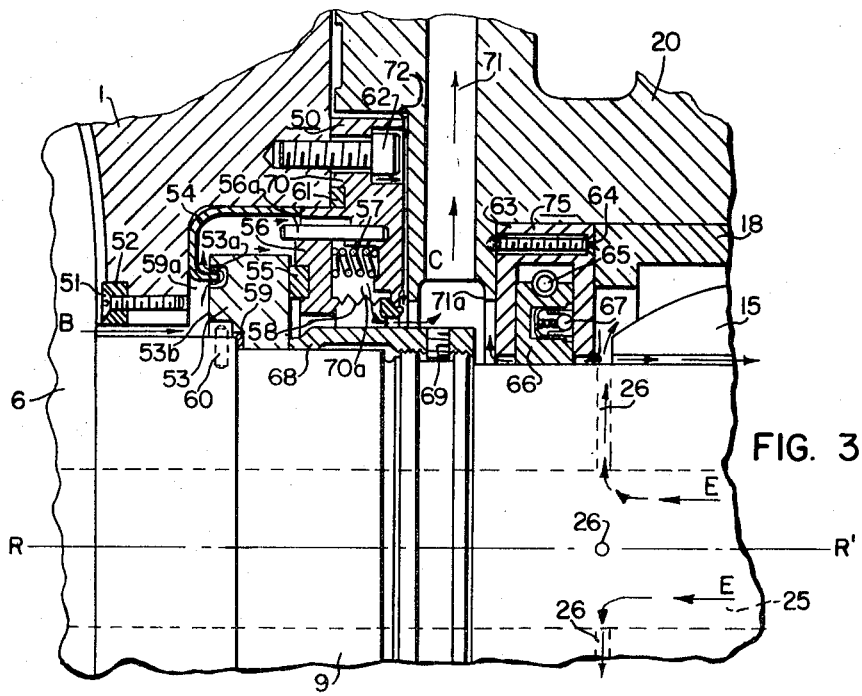
FIG. 3 is an enlarged, fragmentary, partially sectional view of a portion of the structure shown in FIG. 2.

In operation, steam will tend to leak in an axial direction along the shaft 9 as indicated by the arrows B in FIG. 3 and will encounter packing ring 59 which will minimize any leakage along the shaft. Steam will then move radially outward in the annular chamber 59a formed between the mating ring 53 and the valve body 1 and will be forced to go around the tortuous path defined by the annular groove 53a and the dirt excluder 54. Any steam seeping through the groove 53a will be relatively free of any dirt particles so that the steam coming in contact with the carbon ring seal 55 will not damage that carbon seal. The chamber 70a is in fluid communication with the chamber 59a and steam flows thereto as indicated by the arrows B. This insures that the pressure on the axially inner side of the stationary ring member 56 and the pressure on the axially outer side approximately equal so that a resultant force is exerted on the stationary ring member 56 by springs 57 and bellows 58 to maintain the carbon ring seal 55 and the mating ring 53 in frictional abutment.

Some steam leaks past the annular gasket 61 in the main seal body 70 so an annular passage 72 is provided between the main seal body 70 and the valve body 1 which is in fluid communication with the leak-off passage 71. The leak-off passage draws off any leakage of steam from chamber 70a, passage 72, or along the shaft 9. As previously mentioned, it is extremely important to provide zero leakage of the steam to the environment because the steam may be radioactive. The steam indicated by arrows C collected from the leak-off 71 goes to a gland condenser (not shown) and is reprocessed to be used as part of the closed loop system, as commonly known in the art.

Axially outward from the leak-off passage 71 and disposed within the annular bearing support 20 and the annular spacing member 18 is a cooling air regulating structure 75. The structure 75 comprises a U-shaped retaining ring 63. The U-shaped retaining ring 63 is firmly secured to the bearing support 20 by screws 64. Disposed within the U-shaped channel of retaining ring 63 is a pie-shaped radially segmented carbon ring 66. The radially inner diameter of the carbon ring 66 is adjacent to the shaft 9 and is spring biased thereto by spring 65. The ring segments of the ring 66 are securely held in their proper axial position between the two inner walls of the U-shaped retaining ring 63 by a spring-biased ball friction catch 67. The U-shaped retaining ring 63 is in a spaced relation with the shaft 9.

The purpose of the cooling air regulating structure 75 is to regulate the amount of cooling air entering the bearing area from the atmosphere through axial hole 25 and radial holes 26. The carbon ring 66 is segmented to allow for large deflections of the shaft 9, the spring 65 allowing the segment to expand and contract. In operating, cooling air will enter axial hole 25 as indicated by the arrows E on the right-hand portion of FIG. 3, and will then pass through radial holes 26 to cool the bearing 15. The carbon ring 66 will allow a predetermined amount of cooling air to be drawn between the shaft 9 and the carbon ring to the leak-off passage 71.

It will be noted that while the spherical bearing 15, the mechanical bellows seal structure 50 and the cooling air regulating structure 75 have been shown in FIG. 3 and described on the right side of the cylindrical valve body 1 as viewed in FIG. 2, a similar bearing 15, mechanical bellows seal structure 50, and cooling air regulating structure 75 appear on the left side thereof. Therefore, further description is deemed unnecessary.

Figure 5:
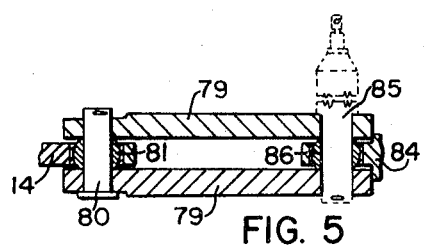
FIG. 5 is a partial cross-sectional view taken along line V—V of FIG. 1.

Referring to FIG. 1, operating lever 14 is keyed to shaft 9 by keys 77. A pair of banana-shaped links 79 are secured to the operating lever 14, one on each side as best shown in FIG. 5. A linking pin 80 is inserted through both banana links 79 and the operating lever 14. A spherical bearing 81 surrounds the linking pin 80, and is housed in operating lever 14 between the two banana links 79.

The other end of banana links 79 are pivotally connected to a disc-shaped piston rod head 84 by fastening means such as by link pin 85. Surrounding pin 85 between the two banana links 79 is a second spherical bearing 86 which is housed in the piston rod head 84. Spherical bearings 80 and 86 are preferably of the Teflon type to reduce bearing friction and insure a quick actuating response. The operating lever 14 and piston rod head 84 are pivotally connected through banana links 79 to minimize the effects of abnormal deflections of shaft 9 on linkage misalignment forces.

The piston rod head 84 is screw-threadedly connected through disc-shaped spacing member 88 to one end of a solid piston connecting rod 89. The threads of the piston rod head 84 are locked to the piston connecting rod 89 by a pin 90 extending longitudinally relative to the piston connecting rod. Piston connecting rod 89 is concentrically disposed in a tubular spring housing member 91. The housing member 91 has on its left end a disc-shaped end wall 92 and on its right end a second disc-shaped end wall 93. On the left end wall 92, and in the center thereof, is an annular rod bushing member 94 disposed concentrically within the end wall encompassing the piston connecting rod 89. The other end of the piston connecting rod 89 passes through the right end wall 93. The right end wall 93 is fastened to the spring housing member 91 by a plurality of nuts 95 and studs 96 or bolts 97. The right end wall 93 serves as a mounting plate for a hydraulic servoactuator 98 (shown in dotted outline). The actuator 98 is secured to the right side of the end wall 93 by a plurality of bolts 99. The actuator 98 has an actuator piston rod 100 which is longitudinally aligned with and screw threaded into the piston connecting rod 89.

An inner helical spring 101 and an outer helical spring 102 are disposed concentrically around the piston connecting rod 89 within the spring housing member 91. The left ends of the springs 101 and 102 bear against the left end wall 92 and the right ends of the springs bear against a disc-shaped movable spring seat 103 concentrically disposed relative to the piston rod 89. The movable spring seat 103 is pivotally supported by spherical washers 104 and 105. The washers 104 and 105 and the spring seat 103 are secured to the piston rod 89 by a hollow flanged sleeve 106 screw threaded on to the end of piston connecting rod 89. Spring jacking screws 107 are provided in the right end wall 93 to initially position and hold the helical springs 101 and 102 and spring seat 103 within the housing member 91. The movable spring seat 103 provides the spring compression.

At the left end wall 92 of the housing member 91 is a cylindrically shaped support yoke 108 secured by fastening means 109 to the spring housing member 91. The support yoke 108 is also secured to the valve body 1 (FIG. 2) by a plurality of nut and bolt arrangements 110 and 111, respectively, as viewed on the right-hand portion of FIG. 2.

Figure 6:
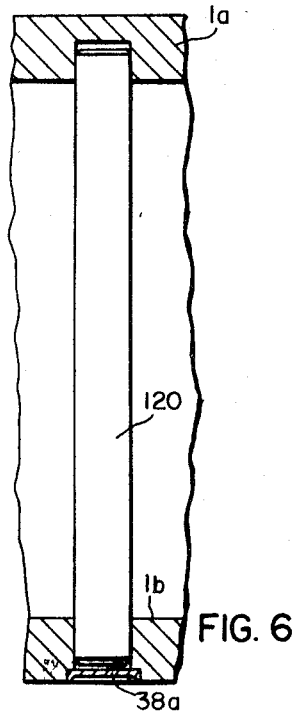
FIG. 6 is an enlarged, partial cross-sectional view taken along line VI—VI of FIG. 1.

Referring to FIG. 1, a cylindrical shaped internal stop pin 120 is fastened to the valve body 1, projecting inwardly therein, which is used to limit the movement of the butterfly disc 6 in the opening direction, the disc being shown in dotted outline. The stop pin 120 is shrunk into the main valve body 1 at one end 1a only as indicated in FIG. 6. At the opposite end 1b of the valve body, a thin annular plate 38a (FIG. 6) is welded to the valve body 1 to provide a steam seal for the stop pin 120 and to secure the stop pin to the valve body.

The stop pin 120 is positioned so that the disc 6, when in the open position, has one end 6c at the upstream end of the valve V and the other end 6d at the downstream end. The centerline L-L' of the disc 6 is inclined in its full open position with the centerline C-C' of the valve V at an acute angle θ. Only a minimum amount of steam will hit surface 6a when the disc is in the open position as most of the restricted steam will strike surface 6b and will flow past butterfly disc 6. The stop pin 120 is placed in "the shadow" of the steam flow past the disc to minimize flow turbulence and flow restriction. By torque loading of the periphery of the valve disc 6 against this stop pin, it also functions as a disc vibration restrainer when the disc is in its normally open position.

An external backup arrangement is provided to insure that the butterfly disc 6 will stop in its open position. This is an external opening stop arrangement provided by a boss on the lever 14 (not shown) contacting the external stop bolt 121 and the locknut 122 both of which are secured to the support yoke 108. The stop bolt 121 and nut 122 are adjusted so that the boss on the operating lever will come into contact with the stop bolt (not shown) during opening travel only if the internal stop pin 120 fails to stop the butterfly disc 6.

The design of the valve structure V enables the use of a single-acting hydraulic actuator 98 which is used to open the butterfly disc 6 against the helical closing spring system. Commonly, double-acting actuators are used but they require much more room, are more expensive and are not as fail safe in a closing operating as springs.

In operation, the piston (not shown) at the end of piston rod 100 is pressurized. It forces the actuator piston rod 100 to move longitudinally relative to the housing member 91, which in turn forces the spring seat 103 and piston connecting rod 89 longitudinally from right to left. This action further compresses springs 101 and 102 while moving banana links 79, and turning lever 14, shaft 9 and butterfly disc 6 in a clockwise direction from the closed to the opened position. Since the springs 101 and 102 are compressed, a positive closing force is always exerted on the butterfly disc 6 when in the open position. When the hydraulic actuating pressure is dumped because of some danger signal, these springs 101 and 102 automatically and very quickly move the actuator piston rod 100, the piston connecting rod 89, and the banana links 79 longitudinally to the right as viewed in FIG. 1 and turn the operating lever 14, the shaft 9 and the butterfly disc 6 counterclockwise to the closed position.

There are two main reasons why a relatively small and single-acting hydraulic actuator 98 could be used with nominal size closing springs 101 and 102 as compared to the large double-acting hydraulic actuators which are commonly used. The first is that the butterfly disc 6 is mounted eccentrically, slightly off center relative to the axis of rotation R-R' of the shaft 9 (FIG. 2). This insures that there is an unbalanced steam torque acting on one-half of the disc 6. Referring to FIG. 1, the upper half of the disc 6 has more surface area than the bottom half so that the steam entering the conduit C and coming in contact with the disc 6 exerts a greater force on the larger half. As the disc starts to close, more and more of the steam flow strikes surface 6b as more of the surface is exposed and because of the unbalance in surface area, the closing speed of the disc is increased and accelerated.

The second reason for the fast closing time is that the disc 6 is slightly inclined at an angle θ toward the closed position because of the pin stop 120. This inclination of the disc 6 allows the use of a smaller initial closing spring force, permitting the use of springs and lessens the actual closing time. These two features allow for a "fail-safe closing feature" in a closing time of approximately 0.15 seconds which is more economical and compact than present methods.

Besides the fast closing requirement of the valve V, the valve must be able to quickly open from the closed position and be able to control the flow of the steam as required under certain conditions such as that required from a load rejection trip due to a very temporary loss of load. In controlling the steam, the butterfly disc 6 could either be required to slowly open or slowly close. As the disc 6 approaches its closed position, there is a corresponding steam pressure drop across the butterfly disc. The higher the pressure drop the greater will be the reactions at the bearings 15 and the greater will be the frictional forces acting on the shaft 9. As previously mentioned, the centerline of the disc 6 is eccentric or offset relative to the axis of rotation R-R' of the shaft 9. This provides an unbalanced steam torque on the disc 6 which overcomes the frictional torque at the bearings 15. Both of these torques are a direct function of the steam pressure drop across the valve so once the correct eccentricity has been determined, the frictional bearing torque will be compensated for at any position of disc 6.

The actuator piston rod 100 (FIG. 1) at the end of its closing stroke, stops the butterfly disc 6 in the closed position. Additionally, a dashpot (not shown) is provided in the actuator 98 to control the end speed of the butterfly disc 6 upon closing, whereby an exit clearance is partially blocked by a portion of the piston rod 100. This slowing down of the valve near the closing position by a dashpot technique dissipates the kinetic energy to a level which can be absorbed by the shaft 9 without damage to the valve components. As previously mentioned, the shaft 9 (FIG. 2) is formed and arranged so that it is secured to the disc 6 at only one side of the disc and is a distance d (FIG. 2) from the operating lever 14 to allow for torsional flexibility of the shaft to absorb some of the energy due to the impact of the disc at closing.

It can now be seen that a highly new and improved valve construction has been disclosed which is particularly useful to quickly shut off and control high-temperature and high-pressure steam through large size conduits. It will also be seen that there is provided a valve having an improved bearing structure and cooling arrangement and an improved self-aligning and self-adjusting zero leakage sealing structure.

We claim:

1. A valve for quickly stopping and controlling the flow of a high-temperature and high-pressure fluid comprising:
   a valve body including therein a butterfly disc,
   a shaft,
   fastening means securing said shaft to said disc,
   said shaft rotatably supporting said disc within said valve body,
   a pair of bearings, one bearing rotatably supporting each end of said shaft,
   said bearings being positioned outwardly of said valve body in an axially outward direction relative to said shaft, so that said bearings are removed from the very high temperature region immediately adjacent said valve body,
   said bearings being formed in a manner to be self-aligning to allow for the increased bending to the shaft as the result of the axially outward location of the bearings,
   said bearings being spherical and having cylindrical Teflon sleeve members disposed between said shaft and said bearings to provide for fast rotation of shaft therein.

2. The valve recited in claim 1 and further including cooling means to cool the bearings,
   said cooling means comprising a pair of holes, one on each end of the shaft, said holes open to atmosphere and extending axially inward relative to the axis of rotation of the shaft,
   a plurality of holes extending radially outward through the shaft and being in fluid communication with said axial holes, and
   said radial holes being in fluid communication with the bearings.

3. The valve recited in claim 2 and further including a leak-off passage in fluid communication with the bearings, means connecting said passage to a region which is below atmospheric pressure thereby drawing in the cooling fluid to regulate the cooling of the bearings.

4. The valve recited in claim 2 and further including a cooling fluid regulating structure to control the rate of flow of the cooling fluid to and past the bearings.

5. The valve recited in claim 2 wherein said bearings are housed in annular bearing supports, said supports having radially extending annular fins relative to the shaft to dissipate heat developed in the bearings, and the ends of the shaft extend axially beyond the bearings relative to the axis of rotation of the shaft.

6. A valve for quickly stopping and controlling the flow of a high temperature and high pressure fluid comprising:
   a valve body including therein a butterfly disc,
   a shaft,
   fastening means securing said shaft to said disc,
   said shaft rotatably supporting said disc within said valve body,
   a pair of bearings, one bearing rotatably supporting each end of said shaft,
   said bearings being positioned outwardly of said valve body in an axially outward direction relative to said shaft, so that said bearings are removed from the very high temperature region immediately adjacent said valve body,
   said fastening means securing said shaft to said disc being located along the axis of rotation of the shaft and being only secured adjacent to one side of the valve body to allow for torsional flexibility of the shaft to absorb a portion of the kinetic energy upon stoppage of the disc on closing.

7. A valve for quickly stopping and controlling the flow of a high-temperature and high-pressure fluid comprising:
   a valve body including therein a butterfly disc.
   a shaft.
   fastening means securing said shaft to said disc.
   said shaft rotatably supporting said disc within said valve body.
   a pair of bearings, one bearing rotatably supporting each end of said shaft. 1
   said bearings being positioned outwardly of said valve body in an axially outward direction relative to said shaft, so that said bearings are removed from the very high temperature region immediately adjacent said valve body,
   an operating lever connected to the shaft,
   link means having one end connected to said lever, 1
   a longitudinally movable piston connecting rod connected at one end to the other end of said link means,
   a pair of helical spring means, one of said spring means concentrically disposed within the other, said spring means concentrically surrounding said rod and urging it in a longitudinally direction so as to move said link means, operating lever, shaft and disc to the closed position of the valve, and
   an actuator connected to the other end of said rod for overcoming the action of said spring means and for moving the disc to the open position.

8. A valve as recited in claim 7 together with a tubular spring housing enclosing the spring means and being coaxial therewith, said housing having end walls, one of said end walls having a bushing through which said rod slides longitudinally, and adjustable means connecting one end of the link means to an end of the rod for adjustably varying the space therebetween.

9. A valve as recited in claim 7 wherein the link means includes parallel links connected together at their ends by spaced pins, and a spherical bearing surrounding each of said pins, the operating lever being pivotally connected to one of said bearings, the rod being connected to the other.

10. A valve for quickly stopping and controlling the flow of a high-temperature and high-pressure fluid comprising:
    a valve body including therein a butterfly disc.
    a shaft,
    fastening means securing said shaft to said disc.
    said shaft rotatably supporting said disc within said valve body,
    a pair of bearings, one bearing rotatably supporting each end of said shaft,
    said bearings being positioned outwardly of said valve body in an axially outward direction relative to said shaft, so that said bearings are removed from the very high temperature region immediately adjacent said valve body, the centerline of said disc being eccentric relative to the axis of rotation of the shaft so as to provide an unbalanced fluid-actuated torque on the disc in the closing direction, and the axis of rotation of the shaft extending through said disc.

11. A valve for quickly stopping and controlling the flow of a high-temperature and high-pressure fluid comprising:
    a valve body including therein a butterfly disc,
    a shaft,
    fastening means securing said shaft to said disc,
    said shaft rotatably supporting said disc within said valve body,
    a pair of bearings, one bearing rotatably supporting each end of said shaft,
    said bearings being positioned outwardly of said valve body in an axially outward direction relative to said shaft, so that said bearings are removed from the very high temperature region immediately adjacent said valve body,
    a stop element disposed inside of said valve body to limit the travel of the disc in the opening direction and, furthermore, to restrain the vibrations of the disc.

12. The valve recited in claim 11 wherein the stop element is positioned so that when the disc is in the open position, the upstream portion of the disc is slightly inclined towards the closing position to provide for quick closing of the disc.

13. The valve recited in claim 11 wherein the stop element is positioned to come into contact with the downstream portion of the disc when the disc is in the open position to maintain the disc at an acute angle $\theta$, where $\theta$ is the angle made by the intersection of the centerline of the valve and the centerline of the disc,
and the upstream portion of the disc is inclined so that the stop element is in the shadow of the upstream portion of the disc to minimize turbulence of the fluid flowing against the stop element.

14. A valve for quickly stopping and controlling the flow of a high-temperature and high-pressure fluid comprising:
a valve body including therein a butterfly disc,
a shaft,
fastening means securing said shaft to said disc,
said shaft rotatably supporting said disc within said valve body,
a pair of bearings, one bearing rotatably supporting each end of said shaft,
said bearings being positioned outwardly of said valve body in an axially outward direction relative to said shaft, so that said bearings are removed from the very high temperature region immediately adjacent said valve body,
cooling means to cool the bearings,
said cooling means comprising a pair of holes one on each end of the shaft open to atmosphere and extending axially inward relative to the axis of rotation of the shaft,
a plurality of holes extending radially outward through the shaft and being in fluid communication with said radial holes,
said radial holes being in fluid communication with the bearings,
a cooling fluid regulating structure to control the rate of flow of the cooling fluid to and past the bearings,
said regulating structure comprising an annular U-shaped retaining ring,
a pipe-shaped segmented carbon ring disposed within said retaining ring,
an annular spring to connect said segments of said carbon ring together and allow for expansion thereof, and
a spring-biased catch mechanism to secure said carbon ring within said retaining ring.

15. a valve for quickly stopping and controlling the flow of a high-temperature and high-pressure fluid comprising:
a valve body including therein a butterfly disc,
a shaft,
fastening means securing said shaft to said disc,
said shaft rotatably supporting said disc within said valve body,
a pair of bearings, one bearing rotatably supporting each end of said shaft,
said bearings being positioned outwardly of said valve body in an axially outward direction relative to said shaft, so that said bearings are removed from the very high temperature region immediately adjacent said valve body,
said disc having enlarged cylindrical hub portions integral therewith,
a bore machined through said disc and hub portions for receiving the shaft,
a plurality of tapered openings extending radially through at least one hub portion, and a plurality of corresponding radially extending tapered openings on the shaft.

16. The valve recited in claim 15 wherein the fastening means securing the shaft to the disc comprises:
a plurality of tapered pins threaded at one end,
a plurality of locknuts,
said pins being inserted radially relative to the shaft, through the hub and shaft openings and snugly seated therein, and
said locknuts being fastened to the threaded end of said pins for drawing said pins further into the openings.

17. The valve recited in claim 16 wherein the pins have a larger diameter end and a smaller diameter end,
said larger diameter end being on the side of the disc subjected to the fluid when the disc is in the closed position,
said smaller diameter end being on the side of the disc not subjected to the fluid when the disc is in the closed position,
and said larger diameter end being flush with the disc.

18. A valve for quickly stopping and controlling the flow of a high-temperature and high-pressure fluid comprising:
a valve body including therein a butterfly disc,
a shaft,
fastening means securing said shaft to said disc,
said shaft rotatably supporting said disc within said valve body,
a pair of bearings, one bearing rotatably supporting each end of said shaft,
said bearings being positioned outwardly of said valve body in an axially outward direction relative to said shaft, so that said bearings are removed from the very high temperature region immediately adjacent said valve body,
an operating lever connected to the shaft,
said lever being external to the valve body,
spring-operated means for rotatively activating said lever and butterfly disc from the open to the closed position,
actuator means for overcoming said spring means and rotatively activating said lever and disc from the closed to the open position,
and the fastening means securing the shaft to the disc being located along the axis of rotation of the shaft on the opposite side of the disc from said operating lever.

19. A valve for quickly stopping and controlling the flow of a high-temperature and high-pressure fluid comprising:
a valve body including therein a butterfly disc,
a shaft,
fastening means securing said shaft to said disc,
said shaft rotatably supporting said disc within said valve body,
a pair of bearings, one bearing rotatably supporting each end of said shaft,
said bearings being positioned outwardly of said valve body in an axially outward direction relative to said shaft, so that said bearings are removed from the very high temperature region immediately adjacent said valve body, and
an internal stop element relative to the valve body to limit the travel of the disc in the opening direction,
and a backup external stop element to prevent further travel of the disc upon failure of the internal stop element.

20. A valve for quickly stopping controlling the flow of a high-temperature and high-pressure fluid comprising:
a valve body including therein a butterfly disc,
a shaft,
fastening means securing said shaft to said disc,
said shaft rotatably supporting said disc within said valve body,
a pair of bearings, one bearing rotatably supporting each end of said shaft,
said bearings being positioned outwardly of said valve body in an axially outward direction relative to said shaft, so that said bearings are removed from the very high temperature region immediately adjacent said valve body,
a mechanical bellows seal structure being provided between the valve body and each bearing to prevent steam leakage to the atmosphere.

21. The valve recited in claim 20 wherein the seal structure comprises a stationary portion and a rotatable portion, said rotatable portion comprising an annular mating ring in sealing relation with said stationary portion, an annular packing ring between said mating ring and shaft, an annular sleeve securing said mating and packing rings to the shaft, said mating ring having an annular groove on its axially inner side, and an annular dirt excluder member projecting into said groove providing a tortuous passage for the leakage fluid to thereby remove dirt particles.

22. The valve recited in claim 20 wherein the seal structure comprises a stationary portion and a rotatable portion, said stationary portion comprising an annular main seal body secured to the valve body, an annular ring seal in sealing relation with said rotatable portion, a cylindrical bellows structure disposed between said main seal body and said ring member, and further including a plurality of coil springs disposed between said ring member and said seal body to cooperate with said bellows structure to maintain said ring seal in sealing relation with said rotatable portion.

23. The valve recited in claim 22 and further including a pin extending axially from the main seal body to the ring member to prevent relative movement between them.

* * * * *